(12) United States Patent
Hahn

(10) Patent No.: US 7,151,730 B2
(45) Date of Patent: Dec. 19, 2006

(54) COPY-PROTECTED COMPACT DISC AND METHOD FOR PRODUCING SAME

(75) Inventor: Yehuda Hahn, Ofra (IL)

(73) Assignee: Macrovision Europe Limited (GB)

( * ) Notice: Subject to any disclaimer, the term of this patent is extended or adjusted under 35 U.S.C. 154(b) by 286 days.

(21) Appl. No.: 10/310,987

(22) Filed: Dec. 6, 2002

(65) Prior Publication Data

US 2003/0133386 A1 Jul. 17, 2003

Related U.S. Application Data

(60) Provisional application No. 60/336,179, filed on Dec. 6, 2001, provisional application No. 60/344,040, filed on Jan. 3, 2002, provisional application No. 60/351,416, filed on Jan. 28, 2002.

(51) Int. Cl.
*G11B 7/007* (2006.01)

(52) U.S. Cl. .............................. 369/53.21; 369/30.07; 369/59.25

(58) Field of Classification Search ............. 369/53.21, 369/47.12, 59.25, 59.24, 47.16, 30.07
See application file for complete search history.

(56) References Cited

U.S. PATENT DOCUMENTS

| | | | |
|---|---|---|---|
| 5,065,388 A | 11/1991 | Roth | |
| 5,325,352 A | 6/1994 | Matsumoto | |
| 5,905,709 A | 5/1999 | Blaukovitsch | |
| 6,104,679 A * | 8/2000 | Sollish | 369/33 |
| 6,333,904 B1 | 12/2001 | Hashimoto | |
| 6,425,098 B1 | 7/2002 | Sinquin et al. | |
| 6,597,648 B1 * | 7/2003 | Yeo et al. | 369/53.2 |
| 6,715,122 B1 * | 3/2004 | Carson et al. | 369/47.12 |
| 6,928,040 B1 * | 8/2005 | Christensen | 369/53.21 |
| 2002/0009033 A1 * | 1/2002 | Christensen | 369/53.21 |
| 2002/0114252 A1 | 8/2002 | Verbakel et al. | |
| 2002/0159591 A1 | 10/2002 | Heylen | |
| 2002/0162058 A1 | 10/2002 | Alcalay | |
| 2002/0186629 A1 | 12/2002 | Winter | |
| 2003/0012375 A1 | 1/2003 | Sako et al. | |
| 2003/0169878 A1 | 9/2003 | Miles | |
| 2004/0109393 A1 * | 6/2004 | Hahn | 369/30.07 |
| 2005/0254386 A1 | 11/2005 | Shavit et al. | |

FOREIGN PATENT DOCUMENTS

| | | |
|---|---|---|
| GB | 2386245 | 9/2003 |
| GB | 2402802 | 12/2004 |
| JP | 2003 141741 A | 5/2003 |

(Continued)

OTHER PUBLICATIONS

Data Interchange on read-only 120mm optical data disk Stard ECMA No. ECMA-130 Jun. 1996, p. 22 lin 1 page 23 left band column.
Volume and file structure of read-only and write-once compact disk media for information interchange Dec. 1994, pp. 1-128, p. 115, paragraph c.3, p. 116 paragrah c.3.3.

(Continued)

*Primary Examiner*—William Korzuch
*Assistant Examiner*—Michael V. Battaglia
(74) *Attorney, Agent, or Firm*—Victor Okumoto

(57) ABSTRACT

A copy-protected compact disc and a method for producing the optical disc and preventing unauthorized copying is provided. In one embodiment, the contents of at least one of the lead-in items in the optical disc are altered so that it is no longer uniform, thereby making a copied disc effectively corrupted and unplayable.

11 Claims, 16 Drawing Sheets

| CTRL | PT | PTIME | | | |
|---|---|---|---|---|---|
| | | PMIN | PSEC | PFRAME | |
| AUDIO | 1 | 0 | 2 | 0 | |
| AUDIO | 1 | 0 | 2 | 0 | |
| AUDIO | 1 | 0 | 2 | 0 | |
| AUDIO | 2 | 3 | 2 | 0 | TOC *i* |
| AUDIO | 2 | 3 | 2 | 0 (a) | |
| AUDIO | 2 | 3 | 2 | 0 | |
| AUDIO | 3 | 6 | 2 | 0 | |
| AUDIO | 3 | 6 | 2 | 0 | |
| AUDIO | 3 | 6 | 2 | 0 | |
| AUDIO | 1 | 0 | 2 | 0 | |
| AUDIO | 1 | 0 | 2 | 0 | |
| AUDIO | 1 | 0 | 2 | 0 | |
| DATA | 2 | 3 | 2 | 0 | |
| DATA | 2 | 3 | 2 | 0 (b) | Misleading item |
| DATA | 2 | 3 | 2 | 0 | |
| AUDIO | 3 | 6 | 2 | 0 | TOC *i+1* |
| AUDIO | 3 | 6 | 2 | 0 | |
| AUDIO | 3 | 6 | 2 | 0 | |

FOREIGN PATENT DOCUMENTS

| | | |
|---|---|---|
| WO | WO 0074053 | 12/2000 |
| WO | WO 01/61695 | 9/2001 |
| WO | WO 01/78074 | 10/2001 |
| WO | WO 01/80546 | 10/2001 |
| WO | WO 02075735 | 9/2002 |
| WO | WO 03034424 | 4/2003 |
| WO | WO 2003/077246 A2 | 9/2003 |
| WO | WO 03/088241 A2 | 10/2003 |
| WO | WO 2004/008456 A1 | 1/2004 |

OTHER PUBLICATIONS

PCT Search Report dated Jun. 25, 2003 from PCT/IL02/00989 ; 2 pages.

PCT Search Report for PCT/IL2004/000239 dated Aug. 31, 2004, 2 pages.

* cited by examiner

| CTRL | PT | PTIME | | |
|---|---|---|---|---|
| | | PMIN | PSEC | PFRAME |
| ⋮ | | | | |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| ⋮ | | | | |

CTRL

FIG 2 (Prior Art)

| | C/A | TNO | PT | MI | SE | FR | ZE | PM | PS | PF |
|---|---|---|---|---|---|---|---|---|---|---|
| 50 { | 01 | 00 | 01 | 97 | 31 | 39 | 00 | 00 | 02 | 00 |
| | 01 | 00 | 01 | 97 | 31 | 40 | 00 | 00 | 02 | 00 |
| | 01 | 00 | 01 | 97 | 31 | 41 | 00 | 00 | 02 | 00 |
| | 01 | 00 | 02 | 97 | 31 | 45 | 00 | 01 | 02 | 00 |
| | 01 | 00 | 02 | 97 | 31 | 46 | 00 | 01 | 02 | 00 |
| | 01 | 00 | 02 | 97 | 31 | 47 | 00 | 01 | 02 | 00 |
| | 01 | 00 | 03 | 97 | 31 | 51 | 00 | 02 | 02 | 00 |
| | 01 | 00 | 03 | 97 | 31 | 52 | 00 | 02 | 02 | 00 |
| | 01 | 00 | 03 | 97 | 31 | 53 | 00 | 02 | 02 | 00 |
| | 01 | 00 | A0 | 97 | 32 | 18 | 00 | 01 | 00 | 00 |
| | 01 | 00 | A0 | 97 | 32 | 19 | 00 | 01 | 00 | 00 |
| | 01 | 00 | A0 | 97 | 32 | 20 | 00 | 01 | 00 | 00 |
| | 01 | 00 | A1 | 97 | 32 | 24 | 00 | 09 | 00 | 00 |
| | 01 | 00 | A1 | 97 | 32 | 25 | 00 | 09 | 00 | 00 |
| | 01 | 00 | A1 | 97 | 32 | 26 | 00 | 09 | 00 | 00 |
| | 01 | 00 | A2 | 97 | 32 | 30 | 00 | 09 | 00 | 00 |
| | 01 | 00 | A2 | 97 | 32 | 31 | 00 | 09 | 00 | 00 |
| | 01 | 00 | A2 | 97 | 32 | 32 | 00 | 09 | 00 | 00 |

Legend:
| | |
|---|---|
| C/A | CTRL/ADR |
| TNO | TNO |
| PT | POINT |
| MI | MIN |
| SE | SEC |
| FR | FRAME |
| ZE | ZERO |
| PM | PMIN |
| PS | PSEC |
| PF | PFRAME |

FIG 3 (Prior Art)

| C/A | TNO | PT | MI | SE | FR | ZE | PM | PS | PF | |
|-----|-----|-----|-----|-----|-----|-----|-----|-----|-----|---|
| 01 | 00 | 01 | 97 | 31 | 39 | 00 | 00 | 02 | 00 | |
| 01 | 00 | 01 | 97 | 31 | 40 | 00 | 00 | 02 | 00 | — 60 |
| 01 | 00 | 01 | 97 | 31 | 41 | 00 | 00 | 02 | 00 | |
| 05 | 00 | B0 | 11 | 30 | 00 | 02 | 11 | 34 | 27 | |
| 05 | 00 | B0 | 11 | 30 | 00 | 02 | 11 | 34 | 27 | — 62 |
| 05 | 00 | B0 | 11 | 30 | 00 | 02 | 11 | 34 | 27 | |
| 01 | 00 | 02 | 97 | 31 | 45 | 00 | 01 | 02 | 00 | |
| 01 | 00 | 02 | 97 | 31 | 46 | 00 | 01 | 02 | 00 | — 60 |
| 01 | 00 | 02 | 97 | 31 | 47 | 00 | 01 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | — 64 |
| 01 | 00 | 03 | 97 | 31 | 51 | 00 | 02 | 02 | 00 | |
| 01 | 00 | 03 | 97 | 31 | 52 | 00 | 02 | 02 | 00 | |
| 01 | 00 | 03 | 97 | 31 | 53 | 00 | 02 | 02 | 00 | |

. . .

| | | | | | | | | | | |
|-----|-----|-----|-----|-----|-----|-----|-----|-----|-----|---|
| 05 | 00 | B0 | 11 | 30 | 00 | 02 | 11 | 34 | 27 | |
| 05 | 00 | B0 | 11 | 30 | 00 | 02 | 11 | 34 | 27 | — 62 |
| 05 | 00 | B0 | 11 | 30 | 00 | 02 | 11 | 34 | 27 | |
| 01 | 00 | A0 | 97 | 32 | 18 | 00 | 01 | 00 | 00 | |
| 01 | 00 | A0 | 97 | 32 | 19 | 00 | 01 | 00 | 00 | |
| 01 | 00 | A0 | 97 | 32 | 20 | 00 | 01 | 00 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | — 64 |
| 05 | 00 | C0 | 80 | 00 | 00 | 00 | 97 | 18 | 06 | |
| 01 | 00 | A1 | 97 | 32 | 24 | 00 | 09 | 00 | 00 | |
| 01 | 00 | A1 | 97 | 32 | 25 | 00 | 09 | 00 | 00 | |
| 01 | 00 | A1 | 97 | 32 | 26 | 00 | 09 | 00 | 00 | |
| 05 | 00 | B0 | 11 | 30 | 00 | 02 | 11 | 34 | 27 | |
| 05 | 00 | B0 | 11 | 30 | 00 | 02 | 11 | 34 | 27 | — 62 |
| 05 | 00 | B0 | 11 | 30 | 00 | 02 | 11 | 34 | 27 | |
| 01 | 00 | A2 | 97 | 32 | 30 | 00 | 09 | 00 | 00 | |
| 01 | 00 | A2 | 97 | 32 | 31 | 00 | 09 | 00 | 00 | |
| 01 | 00 | A2 | 97 | 32 | 32 | 00 | 09 | 00 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | — 64 |
| 05 | 00 | C0 | 80 | 00 | 00 | 00 | 97 | 18 | 06 | |

| CTRL | ADR | POINT | MIN | SEC | FRAME | ZERO | PMIN | PSEC | PFRAME | CRC |
|------|-----|-------|-----|-----|-------|------|------|------|--------|-----|
| *    | *   | *     |     |     |       |      | *    | *    | *      |     |

Item 1

| CTRL | ADR | POINT | MIN | SEC | FRAME | ZERO | PMIN | PSEC | PFRAME | CRC |
|------|-----|-------|-----|-----|-------|------|------|------|--------|-----|
| *    | *   | *     |     |     |       |      | *    | *    | *      |     |

Item 2

FIG. 5 (Prior Art)

| CTRL | PT | PTIME | | |
|------|----|----|----|----|
|  |  | PMIN | PSEC | PFRAME |
| . |  |  |  |  |
| . |  |  |  |  |
| . |  |  |  |  |
| AUDIO | 1 | 0 | 2 | 0 |
| DATA (a) | 1 | 0 | 2 | 0 |
| AUDIO | 1 | 0 | 2 | 0 |
| . |  |  |  |  |
| . |  |  |  |  |
| . |  |  |  |  |

— Misleading item

FIG 6

| CRTL | PT | PTIME | | | CRC |
|------|----|----|----|----|----|
|  |  | PMIN | PSEC | PFRAME |  |
| . |  |  |  |  |  |
| . |  |  |  |  |  |
| . |  |  |  |  |  |
| AUDIO | 1 | 0 | 2 | 0 | 45 |
| AUDIO | 1 | 0 | 2 | 0 | 45 |
| AUDIO | 1 | 0 | 2 | 0 | 5 (a) |
| . |  |  |  |  |  |
| . |  |  |  |  |  |
| . |  |  |  |  |  |

— Invalid item

FIG 7

| CTRL | PT | PTIME | | |
|---|---|---|---|---|
| | | PMIN | PSEC | PFRAME |
| . | | | | |
| . | | | | |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 (a) |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| DATA | 2 | 3 | 2 | 0 |
| DATA | 2 | 3 | 2 | 0 (b) |
| DATA | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| . | | | | |
| . | | | | |

TOC *i* (rows 4–6)
Misleading item (row 15)
TOC *I+1* (rows 17–19)

FIG 8

| CTRL | PT | PTIME | | |
|---|---|---|---|---|
| | | PMIN | PSEC | PFRAME |
| . | | | | |
| . | | | | |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| AUDIO | 3 (a) | 3 | 2 | 0 |
| AUDIO | 3 (a) | 3 | 2 | 0 |
| AUDIO | 3 (a) | 3 | 2 | 0 |
| AUDIO | 3 | 6 | 2 | 0 |
| AUDIO | 3 | 6 | 2 | 0 |
| AUDIO | 3 | 6 | 2 | 0 |
| . | | | | |

TOC *i*
Misleading item
TOC *I*

FIG 9

| ADR | PT | PTIME | | |
|---|---|---|---|---|
| | | PMIN | PSEC | PFRAME |
| . | | | | |
| . | | | | |
| . | | | | |
| 1 | 1 | 0 | 2 | 0 |
| 1 | 1 | 0 | 2 | 0 |
| 1 | 1 | 0 | 2 | 0 |
| 1 | 2 | 3 | 2 | 0 |
| 1 | 2 | 3 | 2 | 0 |
| 1 | 2 | 3 | 2 | 0 |
| 1 | 3 | 6 | 2 | 0 |
| 1 | 3 | 6 | 2 | 0 |
| 1 | 3 | 6 | 2 | 0 |
| 1 | 1 | 0 | 2 | 0 |
| 1 | 1 | 0 | 2 | 0 |
| 1 | 1 | 0 | 2 | 0 |
| 8 | 2 | 3 | 2 | 0 |
| 8 (a) | 2 | 3 | 2 | 0 |
| 8 | 2 | 3 | 2 | 0 |
| 1 | 3 | 6 | 2 | 0 |
| 1 | 3 | 6 | 2 | 0 |
| 1 | 3 | 6 | 2 | 0 |
| . | | | | |
| . | | | | |
| . | | | | |

TOC *i* (upper group)
Misleading item
TOC *i* (lower group)

FIG 10

| CTRL | PT | PTIME | | |
|---|---|---|---|---|
| | | PMIN | PSEC | PFRAME |
| . | | | | |
| . | | | | |
| . | | | | |
| AUDIO | 1 | 0 | 2 | 0 |
| DATA | 1 | 0 | 2 | 0 (a) |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| DATA | 2 | 3 | 2 | 0 |
| DATA | 2 | 3 | 2 | 0 (b) |
| DATA | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| . | | | | |
| . | | | | |
| . | | | | |

Row 2 — Misleading item
Rows 4–9 — TOC *i*
Rows 14–15 — Misleading items
Rows 17–19 — TOC *i* + 1

|     | C/A | TNO | PT | MI | SE | FR | ZE | AM | AS | AF |     |
|-----|-----|-----|-----|-----|-----|-----|-----|-----|-----|-----|-----|
| 126 { | 41 | 00 | 01 | 97 | 31 | 39 | 00 | 00 | 02 | 00 | |
|       | 01 | 00 | 01 | 97 | 31 | 40 | 00 | 00 | 02 | 00 | |
|       | 41 | 00 | 01 | 97 | 31 | 41 | 00 | 00 | 02 | 00 | |
|     | 01 | 00 | 02 | 97 | 31 | 45 | 00 | 01 | 02 | 00 | |
|     | 01 | 00 | 02 | 97 | 31 | 46 | 00 | 01 | 02 | 00 | |
|     | 01 | 00 | 02 | 97 | 31 | 47 | 00 | 01 | 02 | 00 | |
|     | 01 | 00 | 03 | 97 | 31 | 51 | 00 | 02 | 02 | 00 | |
|     | 01 | 00 | 03 | 97 | 31 | 52 | 00 | 02 | 02 | 00 | |
|     | 01 | 00 | 03 | 97 | 31 | 53 | 00 | 02 | 02 | 00 | |
| 128 { | 01 | 00 | A0 | 97 | 32 | 18 | 00 | 01 | 00 | 00 | |
|       | 01 | 00 | A0 | 97 | 32 | 19 | 00 | 01 | 00 | 00 | (a) |
|       | 01 | 00 | A0 | 97 | 32 | 20 | 00 | 01 | 00 | 00 | |
| 130 { | 41 | 00 | A1 | 97 | 32 | 24 | 00 | 09 | 00 | 00 | |
|       | 01 | 00 | A1 | 97 | 32 | 25 | 00 | 09 | 00 | 00 | (b) |
|       | 41 | 00 | A1 | 97 | 32 | 26 | 00 | 09 | 00 | 00 | |
| 132 { | 01 | 00 | A2 | 97 | 32 | 30 | 00 | 09 | 00 | 00 | |
|       | 48 | 00 | A2 | 97 | 32 | 31 | 00 | 09 | 00 | 00 | (c) |
|       | 48 | 00 | A2 | 97 | 32 | 32 | 00 | 09 | 00 | 00 | |

FIG. 17

| C/A | TNO | PT | MI | SE | FR | ZE | AM | AS | AF | |
|---|---|---|---|---|---|---|---|---|---|---|
| 41 | 00 | 01 | 97 | 31 | 39 | 00 | 00 | 02 | 00 | |
| 01 | 00 | 01 | 97 | 31 | 40 | 00 | 00 | 02 | 00 | } 138 |
| 41 | 00 | 01 | 97 | 31 | 41 | 00 | 00 | 02 | 00 | |
| 05 | 00 | B0 | 11 | 30 | 00 | 02 | 11 | 34 | 27 | |
| 05 | 00 | B0 | 11 | 30 | 00 | 02 | 11 | 34 | 27 | (a) } 136 |
| 05 | 00 | B0 | 11 | 30 | 00 | 02 | 11 | 34 | 27 | |
| 41 | 00 | 02 | 97 | 31 | 45 | 00 | 01 | 02 | 00 | |
| 01 | 00 | 02 | 97 | 31 | 46 | 00 | 01 | 02 | 00 | |
| 41 | 00 | 02 | 97 | 31 | 47 | 00 | 01 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | } 140 |
| 05 | 00 | C0 | 80 | 00 | 00 | 00 | 97 | 18 | 06 | |
| 01 | 00 | 03 | 97 | 31 | 51 | 00 | 05 | 02 | 00 | |
| 01 | 00 | 03 | 97 | 31 | 52 | 00 | 02 | 02 | 00 | } 142 |
| 01 | 00 | 03 | 97 | 31 | 53 | 00 | 05 | 02 | 00 | |
| 05 | 00 | B0 | 11 | 30 | 00 | 02 | 16 | 34 | 27 | |
| 05 | 00 | B0 | 11 | 30 | 00 | 02 | 11 | 34 | 27 | (b) } 146 |
| 05 | 00 | B0 | 11 | 30 | 00 | 02 | 16 | 34 | 27 | |
| 01 | 00 | 04 | 97 | 31 | 57 | 00 | 04 | 02 | 00 | |
| 01 | 00 | 04 | 97 | 32 | 58 | 00 | 03 | 00 | 00 | } 148 |
| 01 | 00 | 04 | 97 | 31 | 59 | 00 | 04 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 01 | 00 | 05 | 97 | 32 | 63 | 00 | 04 | 02 | 00 | |
| 01 | 00 | 05 | 97 | 32 | 64 | 00 | 04 | 02 | 00 | |
| 01 | 00 | 05 | 97 | 32 | 65 | 00 | 04 | 02 | 00 | |
| 05 | 00 | B0 | 11 | 30 | 00 | 02 | 11 | 34 | 27 | |
| 48 | 00 | CC | 11 | 30 | 00 | 02 | 11 | 34 | 27 | (c) } 150 |
| 48 | 00 | CC | 11 | 30 | 00 | 02 | 11 | 34 | 27 | |
| 01 | 00 | 06 | 97 | 31 | 69 | 00 | 05 | 02 | 00 | |
| 01 | 00 | 06 | 97 | 31 | 70 | 00 | 09 | 02 | 00 | |
| 01 | 00 | 06 | 97 | 31 | 71 | 00 | 09 | 02 | 00 | |

FIG. 18

| C/A | TNO | PT | MI | SE | FR | ZE | AM | AS | AF | |
|-----|-----|-----|-----|-----|-----|-----|-----|-----|-----|-----|
| 01 | 00 | 01 | 97 | 31 | 39 | 00 | 00 | 02 | 00 | |
| 01 | 00 | 01 | 97 | 31 | 40 | 00 | 00 | 02 | 00 | |
| 01 | 00 | 01 | 97 | 31 | 41 | 00 | 00 | 02 | 00 | |
| *08* | *00* | *B0* | *11* | *30* | *00* | *02* | *11* | *34* | *27* | |
| *08* | *00* | *B0* | *11* | *30* | *00* | *02* | *11* | *34* | *27* | } 154 |
| *08* | *00* | *B0* | *11* | *30* | *00* | *02* | *11* | *34* | *27* | |
| 01 | 00 | 02 | 97 | 31 | 45 | 00 | 01 | 02 | 00 | |
| 01 | 00 | 02 | 97 | 31 | 46 | 00 | 01 | 02 | 00 | |
| 01 | 00 | 02 | 97 | 31 | 47 | 00 | 01 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 01 | 00 | 05 | 97 | 32 | 63 | 00 | 04 | 02 | 00 | |
| 01 | 00 | 05 | 97 | 32 | 64 | 00 | 04 | 02 | 00 | |
| 01 | 00 | 05 | 97 | 32 | 65 | 00 | 04 | 02 | 00 | |
| *08* | *00* | *B0* | *11* | *30* | *00* | *02* | *11* | *34* | *27* | |
| *08* | *00* | *B0* | *11* | *30* | *00* | *02* | *11* | *34* | *27* | |
| *08* | *00* | *B0* | *11* | *30* | *00* | *02* | *11* | *34* | *27* | |
| 01 | 00 | 06 | 97 | 31 | 69 | 00 | 05 | 02 | 00 | |
| 01 | 00 | 06 | 97 | 31 | 70 | 00 | 09 | 02 | 00 | |
| 01 | 00 | 06 | 97 | 31 | 71 | 00 | 09 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 01 | 00 | 01 | 97 | 31 | 39 | 00 | 00 | 02 | 00 | |
| 01 | 00 | 01 | 97 | 31 | 40 | 00 | 00 | 02 | 00 | |
| 01 | 00 | 01 | 97 | 31 | 41 | 00 | 00 | 02 | 00 | |
| *08* | *00* | *B0* | *11* | *30* | *00* | *02* | *11* | *34* | *27* | |
| *08* | *00* | *B0* | *11* | *30* | *00* | *02* | *11* | *34* | *27* | |
| *08* | *00* | *B0* | *11* | *30* | *00* | *02* | *11* | *34* | *27* | |
| *41* | *00* | *02* | *97* | *31* | *45* | *00* | *01* | *02* | *00* | |
| *41* | *00* | *02* | *97* | *31* | *46* | *00* | *01* | *02* | *00* | } 152 |
| *41* | *00* | *02* | *97* | *31* | *47* | *00* | *01* | *02* | *00* | |

COPY-PROTECTED COMPACT DISC AND METHOD FOR PRODUCING SAME

RELATED APPLICATIONS

This application claims priority from U.S. Provisional Application Ser. No. 60/336,179, filed Dec. 6, 2001, entitled "Copy Protected Digital Audio Compact Disc, and Method and System for Producing Same", U.S. Provisional Application Ser. No. 60/344,040, filed Jan. 3, 2002, entitled "A Method and system for Copy Prevention of Compact Discs" and U.S. Provisional Application Ser. No. 60/351,416, filed Jan. 28, 2002, entitled "A Copy Protected Compact Disc and Method for Producing Same", all applications of which are hereby incorporated by reference herein in its entirety.

FIELD OF THE INVENTION

The present invention relates to copy protection, and, more particularly, to a method and system for the copy protection of audio compact discs (CDs).

BACKGROUND OF THE INVENTION

Both computer software and digital audio recordings are commonly recorded on to compact discs (CDs). Computers, such as personal computers (PCs) read audio CDs differently than do consumer CD playback systems, such as car players, boom boxes, portable devices and hi-fi players, for example).

CDs are almost universally made in accordance with the following international standards:
- International Standards Organization (ISO) 9660: Information Processing-Volume and File Structure of CD-ROM for Information Interchange, ISO Standard 13490-1
- International Electrotechnique Commission (CEI-IEC) 908 (generally conforming to what is known as the "Red Book")
- ISO/IEC 10140 (generally conforming to what is known as the "Yellow Book")

Because the data recorded on compact disc is in a digital format with an error-correction capability, it is possible to make faithful copies whose playback is indistinguishable from that of the original disc from which the copy was made. Furthermore, equipment for producing compact discs is readily-available and relatively inexpensive, both for stamped discs and for recorded discs. As a result, the unauthorized or illegal copying of compact discs has thus become a serious problem.

Consumers who have purchased inexpensive computer systems and CD recorders are capable of making copies of original CDs, thereby depriving the copyright owner of a sale.

Only suitable copy-protection methods can succeed in reducing the increasing flood of these unauthorized recorded disc copies. Unfortunately existing prior art copy-protection methods are unsuitable and/or inadequately effective for the audio compact disc.

SUMMARY OF THE INVENTION

The present application relates to a copy-protected compact disc and a method for producing the optical disc and preventing unauthorized copying. The system and method of copy protection also protects CD-R discs and prevents their being extracted on to a personal computer(PC).

There is thus provided, in accordance with an embodiment of the present invention, an optical disc having at least one session, which includes a lead-in having a plurality of subcoding blocks. Each of the plurality of subcoding blocks includes an item in channel Q, which may include at least a Point (PT), Adr/Ctrl, Pmin, Psec and Pframe. The Point of at least one of the plurality of subcoding blocks is identical to the Point in at least one other of the plurality of subcoding block and the value of at least one of a group including Adr/Ctrl, Pmin, Psec and Pframe in at least one of the plurality of subcoding blocks may differ from the value of at least one of the corresponding group of Adr/Ctrl, Pmin, Psec and Pframe in at least one other of the plurality of subcoding blocks.

In addition, in accordance with an embodiment of the present invention, the plurality of subcoding blocks may include a repetition of items, wherein at least one of the group including Adr/Ctrl, Pmin, Psec and Pframe of at least one of the repetition of items may be altered.

Furthermore, in accordance with an embodiment of the present invention, at least one of the values in the control data of the one of the repetition of items may be replaced by a misleading or invalid value. The misleading or invalid value may include an indication that an audio portion of the disc contains data or vice versa. Alternatively, the misleading or invalid value may indicate that the starting time of the track is invalid or misleading.

Furthermore, in accordance with an embodiment of the present invention, at least one of the values Cyclic Redundancy Check (CRC) of the one of the repetition of Items is replaced by a misleading or invalid value.

In addition, in accordance with an embodiment of the present invention, the plurality of subcoding blocks may include a continuous repetition of table of contents (TOCs). At least one item in at least one of the group including Adr/Ctrl, Pmin, Psec and Pframe of one of the repetition of table of contents (TOCs) may have a different value from the corresponding item in at least one other of the repetition of table of contents (TOCs). One of the repetitions of table of contents (TOCs) may include a misleading or invalid triplet. The misleading or invalid triplet may include an indication that an audio portion of the disc contains data or vice versa. Alternatively, the misleading or invalid value may indicate that the starting time of the track is invalid or misleading.

Furthermore, in accordance with an embodiment of the present invention, the misleading or invalid triplet may include a misleading or invalid point Alternatively, the misleading or invalid triplet may include setting the Adr field to an invalid value.

Furthermore, in accordance with an embodiment of the present invention, one of the repetitions of table of contents (TOCs) may include an interleaved pattern of alternating valid and invalid triplets. The alternating valid and invalid triplets may be represented by audio and data item respectively, or vice versa. Alternatively, the pattern may be randomized. Each track may be represented by at least one audio and one data item.

Furthermore, in accordance with an embodiment of the present invention, one of the points of the repetition of table of contents (TOCs) may remain uniform.

Furthermore, in accordance with an embodiment of the present invention, the one of the repetition of table of contents (TOCs) may include one of a group including at least one misleading or invalid triplet.

Furthermore, in accordance with an embodiment of the present invention, the plurality of subcoding blocks may include a combination of a repetition of items, and continuous repetition of table of contents (TOCs). One of the group including Adr/Ctrl, Pmin, Psec and Pframe of at least one of the repetition of items may be altered and at least one item in at least one of the group including Adr/Ctrl, Pmin, Psec and Pframe of one of the repetition of table of contents (TOCs) may have a different value from the corresponding item in at least one other of the repetition of table of contents (TOCs).

In addition, in accordance with an embodiment of the present invention, the plurality of subcoding blocks may include a plurality of zones, wherein an alteration algorithm may be applied to each of the plurality of zones. The plurality of zones may include any combination of a group including a valid table of contents (TOCs), an invalid table of contents (TOCs), an interleaved pattern of alternating valid and invalid entries and one of a group including at least one data track or at least one invalid triplet. The invalid table of contents (TOCs) may include one repetition of the table of contents (TOCs), which is different from at least one other of repetition of the table of contents (TOCs).

Furthermore, in accordance with an embodiment of the present invention, the A0, A1, and A2 points may have invalid or misleading values.

In addition, in accordance with an embodiment of the present invention, the optical disc may include a multi-session disc having a plurality of multi-session pointers, wherein at least one of the plurality of multi-session pointers may be invalid or misleading. Alternatively, the optical disc may include a multi-session disc having a plurality of multi-session pointers, wherein at least one of the plurality of multi-session pointers may be invalid or misleading.

Furthermore, in accordance with an embodiment of the present invention, the optical disc may include one of a group including a compact disc (CD) a recordable compact disc (CD-R) and a CD-Rewritable compact disc (CD-RW).

Additionally, in accordance with an embodiment of the present invention, there is also provided, a method for protecting an optical disc from unauthorized copying. The method includes the steps of:

generating a lead-in, the lead-in having a plurality of subcoding blocks, each of the plurality of subcoding blocks, includes an item having at least a Point (PT), Adr/Ctrl, Pmin, Psec and Pframe, and altering the value of at least one of a group including Adr/Ctrl, Pmin, Psec and Pframe in at least one of the plurality of subcoding blocks to a value different from at least one of the corresponding group of Adr/Ctrl, Pmin, Psec and Pframe in at least one other of the plurality of subcoding blocks.

Additionally, in accordance with an embodiment of the present invention, there is provided, a method for generating a valid lead-in containing continuous repetition of table of contents (TOCs). The method includes the steps of:

reading the Program Area subcoding blocks pointed to by the continuous repetition of table of contents (TOCs); and discarding invalid or misleading triplets, so determined by the reading of Program Area.

Finally, there is also provided in accordance with an embodiment of the invention, a further method for generating a valid lead-in containing continuous repetition of table of contents (TOCs). The method includes the steps of:

reading the entire Program Area;

selecting the channel Q of a frame to be analyzed;

comparing the track number (TNO) of the analyzed frame with the track number (TNO) of the previous frame;

if the track number (TNO) of the analyzed frame is greater than the track number (TNO) of the previous frame, creating a TOC entry with the new track number and the ATime of the analyzed frame.

BRIEF DESCRIPTION OF THE DRAWINGS

The invention is herein described, by way of example only, with reference to the accompanying drawings, wherein:

FIG. 2 is a schematic prior art representation of portions of two consecutive uniform TOCs in a given session of the CD of FIG. 1;

FIG. 3 is a prior art schematic representation of standard track pointers of the CD of FIG. 1;

FIG. 4 is a schematic prior art representation of multi-session pointers of the CD of FIG. 1;

FIG. 5 is a schematic prior art representation of a uniform TOC containing uniform triplets of the CD of FIG. 1;

FIG. 6 is a schematic illustration of a system for the copy protection of audio compact discs (CDs), according to an embodiment of the present invention;

FIG. 7 is a schematic illustration of a system for the copy protection of audio compact discs (CDs), according to a further embodiment of the present invention;

FIG. 8 is a schematic illustration of a system for the copy protection of audio compact discs (CDs), according to a further embodiment of the present invention;

FIG. 9 is a schematic illustration of a system for the copy protection of audio compact discs (CDs), according to a further embodiment of the present invention;

FIG. 10 is a schematic illustration of a system for the copy protection of audio compact discs (CDs), according to a further embodiment of the present invention;

FIG. 17 is a schematic illustration of a system for the copy protection of audio compact discs (CDs), according to an embodiment of the present invention;

FIG. 18 is a schematic illustration of a system for the copy protection of audio compact discs (CDs), according to a further embodiment of the present invention;

FIG. 19 is a schematic illustration of a system for the copy protection of audio compact discs (CDs), according to a further embodiment of the present invention;

GLOSSARY

Figures 1A, 1B, 1C, 1D, 1E:
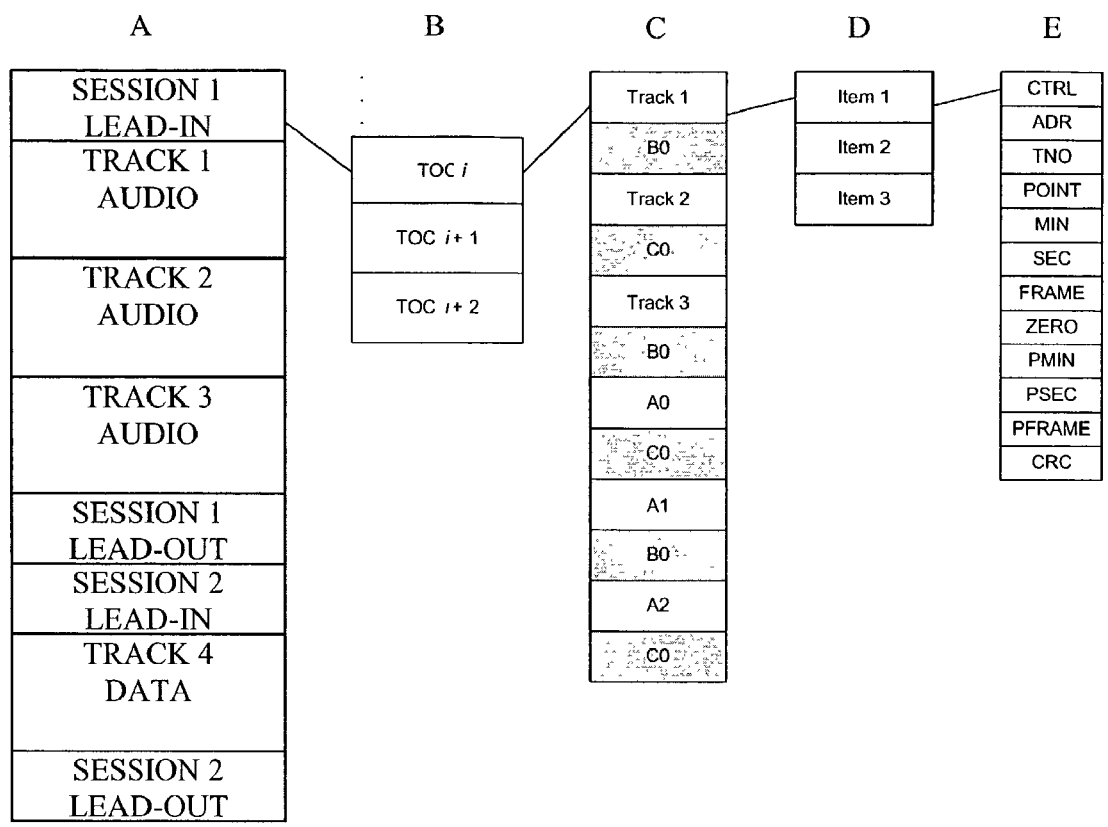
FIGS. 1a–1e are a schematic prior art representation of the structure of a compact disc (CD)

The following glossary of terms and acronyms are used in the present patent application.

| Term | Description |
| --- | --- |
| CD | Compact Disc including premastered, CD-R, and CD-RW discs. |
| Channel Q | Bits $d_2$ of a subcoding block, arrayed as a single 12-byte structure, delimited by S0 and S1 subcoding sync patterns. |
| CRC | Cyclic Redundancy Check. Field in channel Q that checks validity of channel Q data. |
| Identical Items | Items that have the same values in the fields: CTRL, ADR, POINT, PMIN, PSEC, and PFRAME. |
| Identical Triplets | Two triplets that have the same values in the fields: CTRL, ADR, POINT, PMIN, PSEC, and PFRAME. |
| Identical TOCs | Two TOCs in which each triplet in the first TOC is identical to a corresponding triplet in the second TOC. |
| Invalid Item | An item that cannot be interpreted correctly under the rules of IEC 908. For example, an item that has an ADR value that is not 1, 2, or 5, or an item that has an invalid CRC. |
| Item | Channel Q of a subcoding block in the lead-in. |
| Lead-in | Track 0 of a session, contains TOCs in channel Q. |
| Lead-out | Control portion of a session that follows a session's tracks. |
| Misleading Item | An item that can be interpreted correctly, but does not match the track number, index, or control values in channel Q in the Program Area frame pointed to in its ATIME fields. |
| Polymorphic | Not uniform. A polymorphic triplet contains at least one invalid or misleading item. A polymorphic lead-in is defined as a lead-in having a at least two non-identical TOCs or at least one triplet in one TOC that is not uniform |
| PTIME | Point Time. Absolute starting time of POINT. In an item, PTIME is encoded in the fields PMIN to PFRAME as defined in Table 1. |
| Session | Section of a CD containing either audio or data tracks, or a combination of the two. A standard session contains a lead-in, at least one track, and a lead-out. |
| TOC (Table of Contents) | The minimum number of items required to form a complete description of a session, including track pointers, A0, A1, and A2 entries as well as any multi-session pointers that are encapsulated within the items. TOCs are repeated to end of a session's lead-in. |
| Track | Single content unit (program item) on a CD. |
| Triplet | Three consecutive lead-in items following a POINT boundary. |
| Uniform Lead-in | Lead-in composed only of identical TOCs. |
| Uniform TOC | TOC composed only of identical triplets. |
| Uniform Triplet | Triplet composed of three identical items. |

DESCRIPTION OF EMBODIMENTS

The present application relates to a copy-protected compact disc and a method for producing the disc and preventing unauthorized copying. The present invention provides an improved method that changes the contents of any lead-in item in any optical disc so that it is no longer uniform, as described in embodiments of the present invention, hereinbelow, so that the copied disc becomes effectively corrupted and unplayable.

Reference is now made to FIGS. 1a–1e which schematically represent the structure of a compact disc (CD) having uniform lead-ins. The exemplary disc is shown, for purposes of clarity and simplicity only, as having two sessions: Session 1 with three audio tracks (tracks 1–3), followed by Session 2 containing a single data track (track 4).

FIG. 1b illustrates the structure of the lead-in for session 1, showing that the lead-in is composed of uniform Table of Contents (TOCs) consisting of A0, A1, A2 and track pointers, that are repeated throughout the length of the lead-in. The TOC for session 2 (not shown) is similar to session 1 but contains only a single data track.

FIG. 1c shows the triplets in each TOC, with the multi-session pointers (B0 and C0). FIG. 1d shows that each triplet is composed of three items. In a uniform lead-in, each item in a triplet is identical. FIG. 1e shows the fields in a lead-in item.

The inventors have realized that it is possible to protect CDs from unauthorized copying by making changes to the session lead-in. One novelty of the copy protection method is that disc produced by the copy protection method applies these techniques to CD-R discs, thereby protecting them and preventing them from being extracted on a PC. Due to the raw write modes available in current home CD-R writing hardware and software, no special modifications are needed to implement the lead-in copy protection on CD-R and CD-RW discs.

Each session in a CD has a lead-in, which contains repetitions of the Table of Contents (TOC).

If a session's lead-in contains invalid data, a PC may not be able to read it properly. However, consumer CD playback systems (such as car players, boom boxes, portable devices, and hi-fi players) can ignore certain types of invalid lead-in data. For example, certain alterations to the lead-in of a disc's audio session make it difficult for a PC CD-ROM drive to correctly interpret the session, and hence, the disc, but these alterations do not affect the ability of consumer playback systems to play the disc.

In addition, certain CD reading devices read different offsets of the lead-in to determine the TOC, allowing specific instances of the TOC to target specific players.

In the present application the term "polymorphic" is defined as non-uniform. A polymorphic triplet is defined as a triplet, which contains at least one invalid or misleading item. A polymorphic lead-in is defined as a lead-in having a at least two non-identical TOCs or at least one triplet in one TOC that is not uniform.

Channel Q

According to IEC 908, a subcoding block consists of the subcoding symbols in 98 consecutive EFM frames, delimited by the S0 and S1 sync patterns. Channel Q is the second most significant bit in each subcoding symbol following the sync pattern. In the program area of a disc, channel Q generally contains timing information, such as absolute disc time or track time. In the lead-in, however, channel Q contains information about the layout of the disc.

Table 1 describes a single item (ITEM) in channel Q, using the fields defined for the lead-in. For convenience, field names are used to refer to the bit position, even though the names are only valid for ADR=1 or ADR=5.

TABLE 1

Single ITEM in lead-in channel Q (Mode 1)

| Field | Length |
|---|---|
| CTRL (Control) | 4 bits |
| ADR (Mode) | 4 bits |
| TNO (Track Number) | 8 bits |
| POINT | 8 bits |
| MIN | 8 bits |
| SEC | 8 bits |
| FRAME | 8 bits |
| ZERO | 8 bits |
| PMIN | 8 bits |
| PSEC | 8 bits |
| PFRAME | 8 bits |
| CRC | 16 bits |

Uniform TOCs

FIG. 2 is a schematic representation of portions of two consecutive uniform TOCs in a given session, showing selected fields. In this figure, and those based on it, "AUDIO" and "DATA" are used instead of their corresponding values of 00XXb and 01XXb. For clarity this partial table omits the A0–A2 pointers and multi-session pointers.

A0–A2 Items

In addition to the track pointers, lead-ins contain A0–A2 items, which state the number of the first track in a disc (A0), the number of the last track (A1) and the starting time of the current session's lead-out (A2). These items follow the standard track pointers as shown in FIG. 3.

Multi-Session Discs

In addition to the track pointers and A0–A2 pointers, a multi-session disc has a further set of pointers that allow navigation between sessions in a linked list. These pointers are called the multi-session pointers. They are interleaved between the standard track pointers, referenced 60, as shown in FIG. 4 with the multi-session pointers bolded, referenced 62 and 64.

Lead-ins

A uniform lead-in is composed of Table of Contents (TOCs), with a TOC being the minimum number of items needed to fully describe a session. A uniform TOC contains uniform triplets. A triplet is composed of three identical cortiguous items that follow a POINT boundary. Two items are said to be identical if the values of the corresponding fields indicated by an * are identical (see FIG. 5). A triplet is said to be uniform if all three of its items are identical.

In the present invention, a lead-in is altered so that it contains valid, misleading, and/or invalid items arranged in a polymorphic manner, meaning that at least two of the lead-in's TOCs are not identical or at least one triplet in one of the lead-in's TOCs is not uniform.

As described below, these properties make it possible to alter the lead-in so as to render the disc useless to PCs without rendering the disc unreadable to a home or auto system.

One method of changing a lead-in is to alter items so that not all items in a triplet are uniform.

Reference is now made to FIG. 6, which illustrates a system for the copy protection of audio compact discs (CDs), according to an embodiment of the present invention. FIG. 6 illustrates the alteration of a portion of the lead-in so that the triplet is not uniform.

In the example of FIG. 6, the second of three identical AUDIO items (marked as A1b in FIG. 2) has been altered so as to indicate DATA instead of AUDIO (the triplet item is bolded and the alteration is marked by the letter "a"). In a further embodiment of the present invention, illustrated in FIG. 7, the third of three identical AUDIO items (marked as A1c in FIG. 2) has been altered to show an invalid CRC item of 5 (instead of 45).

In a further embodiment of the present invention, polymorphic TOCs are created while preserving uniform triplets. It will be appreciated by persons knowledgeable in the art that there are many possible methods of creating non-uniform (polymorphic) TOCs. Non-limiting examples of copy protection using polymorphic TOCs include comparing a track number with an iteration number and amending the item accordingly, or comparing the PTIME fields with known boundary values and amending the item according to physical location within the lead-in.

Reference is now made to FIG. 8 which illustrates an embodiment of the invention in which a portion of the lead-in (AUDIO triplet (marked A1 in FIG. 2 and "a" in FIG. 8) is altered to a DATA triplet (marked "b" in FIG. 8).

FIG. 9, to which reference is now made, llustrates a further embodiment of the invention in which the point (PT) of a triplet is amended to 3 (marked by the letter "a") instead of the correct value of 2 (A5 in FIG. 2).

Reference is now made to FIG. 10, which illustrates a further embodiment of the invention in which polymorphic TOCs are created by setting the Mode (ADR) field of an item or an entire triplet to a value other than 1, 2, or 5. In the exemplary embodiment of FIG. 10, the ADR of a triplet (marked "a") is set to 8 instead of the correct value of 1.

Figure 11:
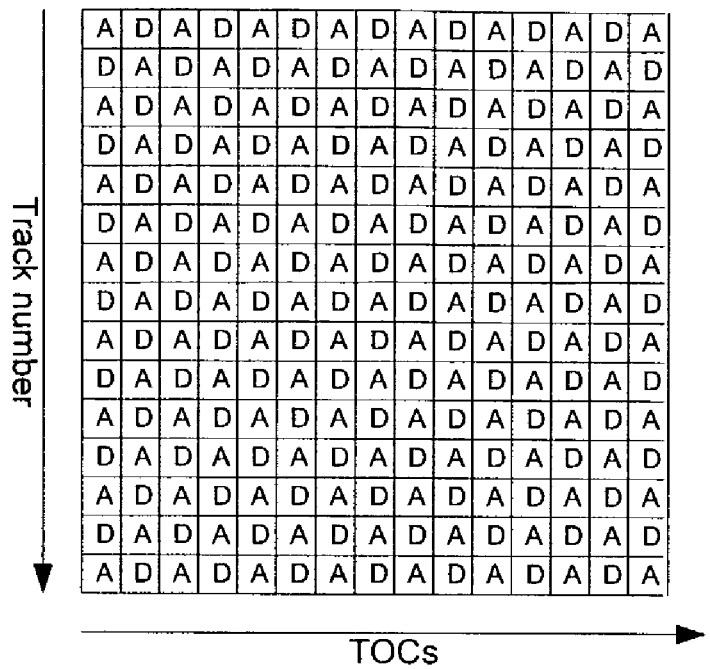
FIG. 11 is a schematic illustration of a system for the copy protection of audio compact discs (CDs), according to a further embodiment of the present invention.
Figure 12:
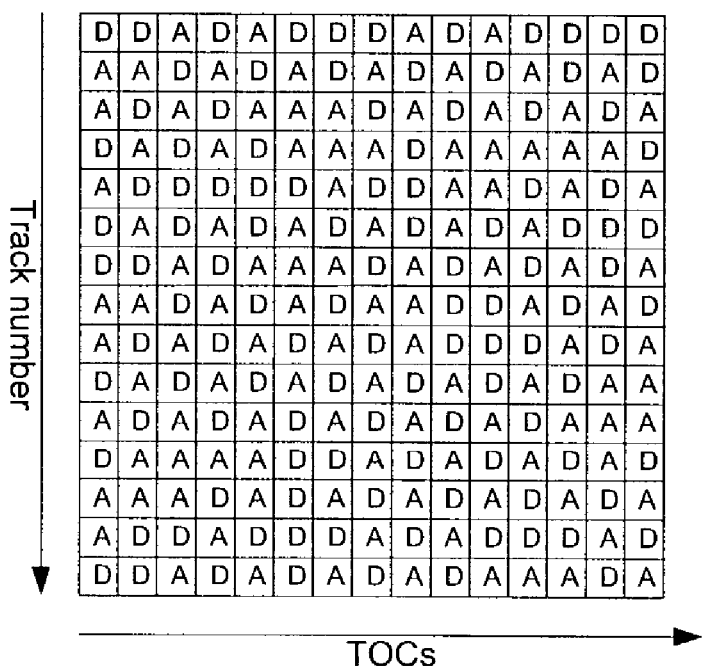
FIG. 12 is a schematic illustration of a system for the copy protection of audio compact discs (CDs), according to a further embodiment of the present invention.
Figure 13:
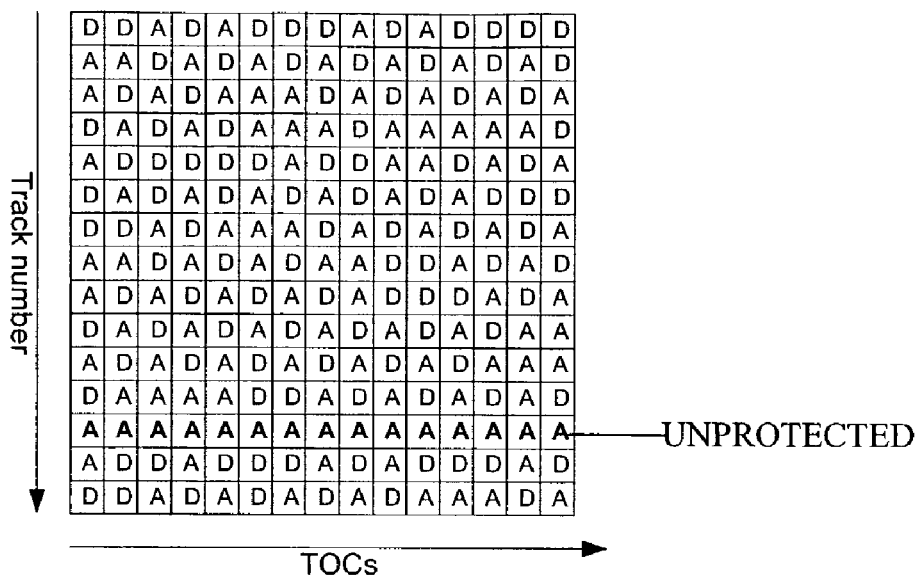
FIG. 13 is a schematic illustration of a system for the copy protection of audio compact discs (CDs), according to an embodiment of the present invention.

In a yet further example of an embodiment of the invention, polymorphic TOCs are produced by creating a "checkerboard" pattern of misleading and valid items. Reference is now made to FIGS. 11–13. FIG. 11 is an exemplary illustration of a "regular" checkerboard composed of alternating valid AUDIO and misleading DATA items.

In the example of FIG. 11, a disc with 15 audio tracks is protected by marking alternate tracks as DATA (setting the data bit in the ADR/Ctrl byte), instead of AUDIO, thereby creating misleading items. It will be appreciated by persons knowledgeable in the art that any other technique of creating misleading items may be used in place of setting the data bit.

FIG. 12 is an exemplary illustration of a randomized checkerboard of polymorphic TOCs. In the example of FIG. 12, a "regular" checkerboard is first created (similar to FIG. 11) and then the checkerboard is randomized. Each track is represented by at least one A (AUDIO) and one D (DATA) item.

Reference is now made to FIG. 13, which illustrates a further embodiment of the invention using polymorphic TOCs, in which a partial checkerboard is created. In this case, a "regular" and/or a randomized checkerboard is created with the additional modification of containing at least one unprotected row (a row of AUDIO items shown bolded in FIG. 13).

Figure 14:
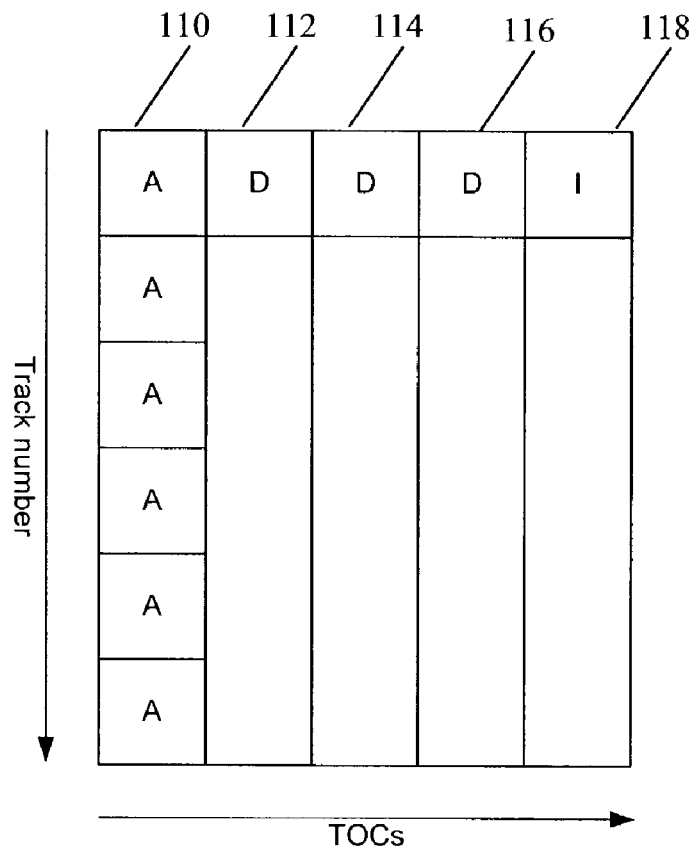
FIG. 14 is a schematic illustration of a system for the copy protection of audio compact discs (CDs), according to a further embodiment of the present invention.

Reference is now made to FIG. 14, which illustrates a further embodiment of the invention utilizing polymorphic TOCs. In the example of FIG. 14, a valid TOC is created at an offset of the lead-in (column 110). A number of misleading TOCs are added (columns 112, 114, 116) containing only one data track. Finally, the sequence is terminated with a single invalid triplet (column 118).

It will be appreciated by persons knowledgeable in the art that alterations may be also be made to an individual triplet (as described hereinabove with reference to FIGS. 6 and 7 for example) as well as alterations to a TOC, either independently or any combination with polymorphic triplets and TOCs.

Figures 15, 16:
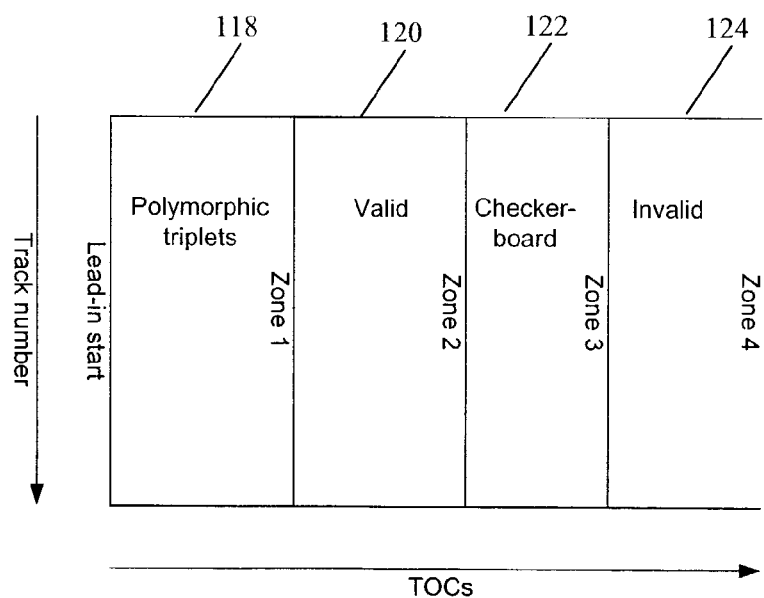
FIG. 15 is a schematic illustration of a system for the copy protection of audio compact discs (CDs), according to a further embodiment of the present invention.
FIG. 16 is a schematic illustration of a system for the copy protection of audio compact discs (CDs), according to a further embodiment of the present invention.

Reference is now made to FIG. 15, which illustrates a further embodiment of the invention in which a lead-in is altered so as to comprise a combination of polymorphic triplets and polymorphic TOCs. The example of FIG. 15 illustrates a polymorphic triplet (marked by the letter "a") in which the AUDIO item has been amended to a DATA item and the polymorphic TOC (marked by the letter "b"), in which the AUDIO triplet has been amended to a DATA triplet.

Reference is now made to FIG. 16, which illustrates a further embodiment of the invention in which both polymorphic triplets and polymorphic TOCs are applied to the same lead-in (known as a "composite" disc). Such a lead-in contains zones, with a zone being a series of consecutive TOCs sharing a common alteration algorithm.

In the example of FIG. 16, the first zone 120 comprises triplets, which are all polymorphic. The second zone 122 comprises valid uniform TOCs, while the third zone comprises a checkerboard 123 (similar to the checkerboard embodiments described hereinabove with reference to FIGS. 12 and 13). In the fourth zone, all of the items are DATA as described hereinabove with reference to FIG. 14. As will be appreciated by persons knowledgeable in the art the examples are non-limiting and may be applied to any session of a "composite" disc.

Reference is now made to FIG. 17 which illustrates a further embodiment of the invention in which the A0–A2 items in polymorphic TOCs may be changed. The Control field (C/A) may be amended so that triplet 126 is non-uniform, that is part of the C/A of triplet 126 is amended to 41h (instead of 01h—see triplet 50 of FIG. 3).

In one embodiment, the A0–A2 items of a triplet 128 (marked "a") may be left unaltered, regardless of processing of triplet 126.

The example of FIG. 17 further illustrates two alternative ways of altering the A0–A2 items. In triplet 130 (marked "b"), the A0–A2 items may be invalidated (to "41") in the same ways as the surrounding track pointers of triplet 126. In triplet 132, the A0–A2 items may be invalidated in a way that is different from the surrounding track pointers so that part of the C/A is altered to give a misleading (and invalid) reading of "48".

As illustrated, modifications may occur in any of the three items of a triplet.

While this example demonstrates polymorphic triplets with A0–A2 items, it will be appreciated by persons knowledgeable in the art that A0–A2 items may also be applied to polymorphic TOCs.

Reference is now made to FIG. 18, which illustrates a further embodiment of the invention in which the multi-session pointers of a Polymorphic TOC may be altered. As described hereinabove with reference to FIG. 4, a multi-session disc has a set of multi-session pointers 62 that are interleaved between the standard track pointers 60 and allow navigation between sessions in a linked list.

In one embodiment, the multi-session pointers 136 (marked "a") (equivalent to multi-session pointers 62 in FIG. 4) may be left unaltered, regardless of processing of triplets 138, 140. The C/A values of two of the triplets 138, 140 have been altered to "41"instead of "01" in multi-session pointers 60 of FIG. 4. Similarly, multi-session pointers 142 (equivalent to multi-session pointers 64 in FIG. 4) is unaltered.

The example of FIG. 18 further illustrates two alternative ways of altering the multi-session pointers. In triplet 144 (marked "b"), the multi-session pointers may be invalidated in the same ways as the surrounding track pointers of triplets 146, 148. In triplet 150, the multi-session pointers be invalidated in a way that is different from the surrounding track pointers so that part of the C/A triplet is altered to give a misleading (and invalid) reading of "48". Modifications may occur in any of the three items in a triplet.

While this example demonstrates polymorphic multi-session triplets, it will be appreciated by persons knowledgeable in the art that polymorphic TOCs may also be similarly amended.

Reference is now made to FIG. 19 which is an exemplary illustration of an embodiment of the present invention in which polymorphic TOCs include both a polymorphic TOC and multi-session pointers that are all invalidated. In the example of FIG. 19, all alterations are italicized and the multi-session pointers are bolded. The second audio track 152 has a misleading Ctrl in the second TOC shown (Ctrl=4, indicating DATA, rather than AUDIO) and all the B0 multi-session pointers 154 have an invalid ADR (ADR=8).

Figure 20:
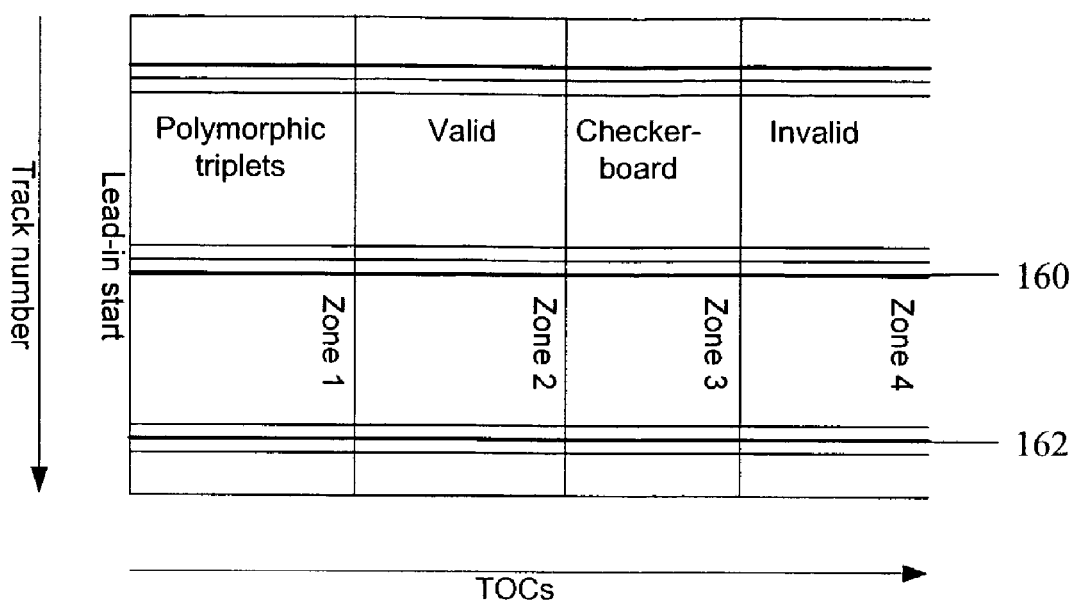
FIG. 20 is a schematic illustration of a system for the copy protection of audio compact discs (CDs), according to a further embodiment of the present invention.

This type of modification can be made to polymorphic TOCs that have polymorphic triplets in which the multi-session pointers all point to an incorrect location in the Program Area. Reference is now made to FIG. 20 which is an exemplary illustration of an embodiment of the present invention in which a composite disc, (described hereinabove with reference to FIG. 16), may also include multi-session pointers invalidated in a polymorphic manner. For example, in FIG. 20, the bold lines 160, 162 indicate the invalidated multi-session pointers.

It will be appreciated that in a composite disc, different multi-session effects may be applied to each zone. Furthermore, certain zones may eliminate multi-session pointers altogether, effectively "hiding" the second session. In a disc with more than two sessions, a middle session may be hidden in certain device classes by restricting or modifying the multi-session pointers or eliminating them on a zone-by-zone basis.

Figure 21:
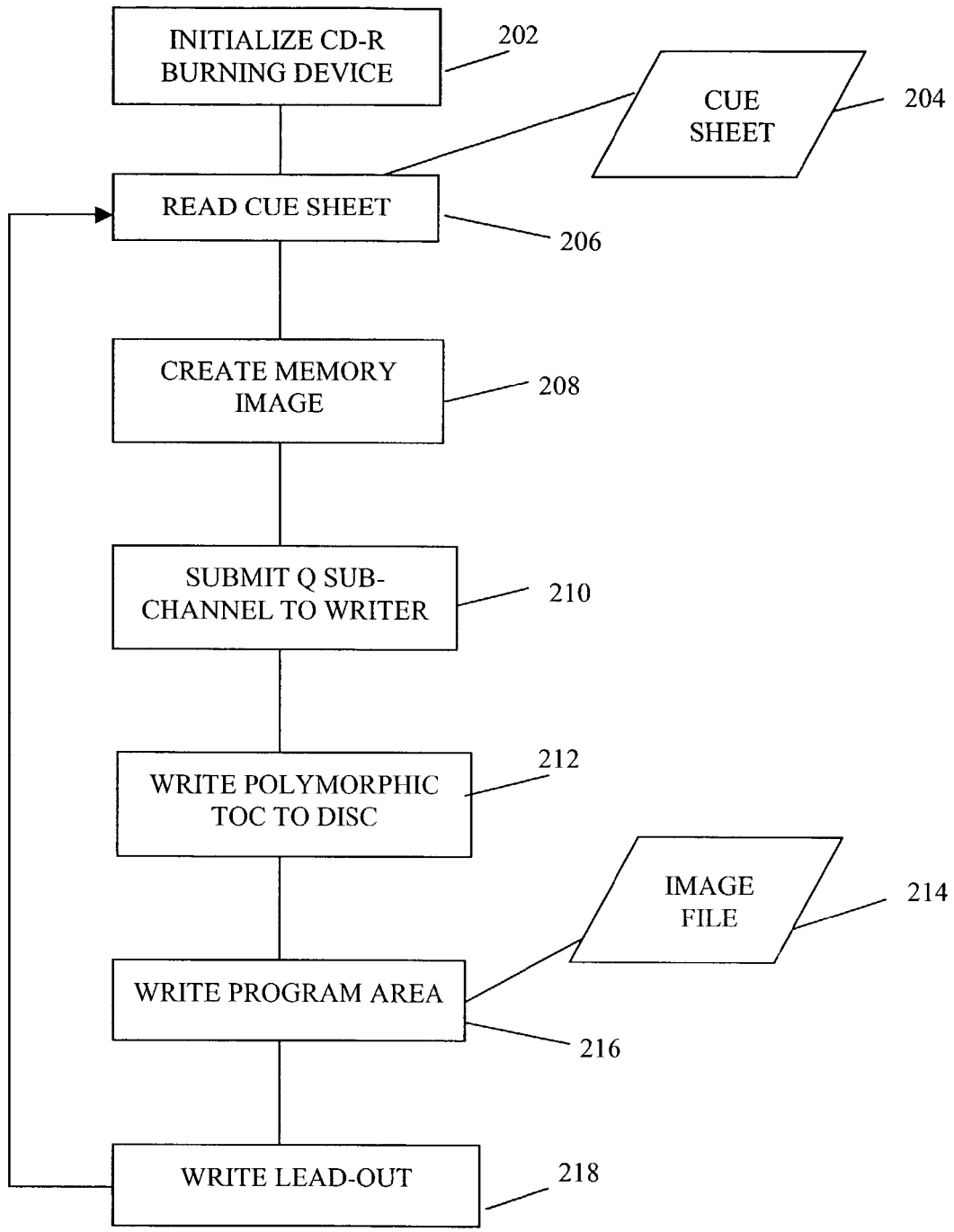
FIG. 21 is a flow-chart illustration of a method of generating a Polymorphic TOC disc, according to an embodiment of the present invention.

Reference is now made to FIG. 21, which is a flowchart illustration of a method of generating a Polymorphic TOC disc.

The CD-R writer determines that a blank CD-R is in place in the drive and is initialized in Raw DAO mode (step 202). The cue sheet (204) is read (step 206) and a memory image of the lead-in to be produced is created (step 208). The cue sheet describes the layout of the disc in terms of tracks. At a minimum, the cue sheet may provide the absolute time offset in frames for each track and the total number of tracks.

The lead-in is formed in the channel Q of successive frames and submitted (step 210) in blocks of frames to the writer. For each frame, an algorithm, which generates the form of polymorphism applicable to that frame, may be applied. The correct Q channel is placed into the raw stream that is submitted to the writer (step 212).

After the lead-in is written, the Program Area is written (step 216) using the image file (214). The image file may be a 44.1K sample per second stereo (16 bits per sample) PCM file containing the main channel of the disc as a waveform, or a raw 2352-byte per sector ISO file for a data disc. The subchannel is calculated normally for each frame according to the algorithms in IEC 908. The lead-out is then written (step 218).

In a multi-session disc, steps 206–218 repeated for each session.

It may be useful to create a valid audio TOC, for example, for use in a first session. One method of creating a valid audio TOC may read the TOC sequentially, only the basic parameters from the TOC are determined. The basic parameters must be valid regardless of polymorphism, and thus a true TOC may be recreated by reading the Program Area entries pointed to by any valid triplets.

Figure 22:
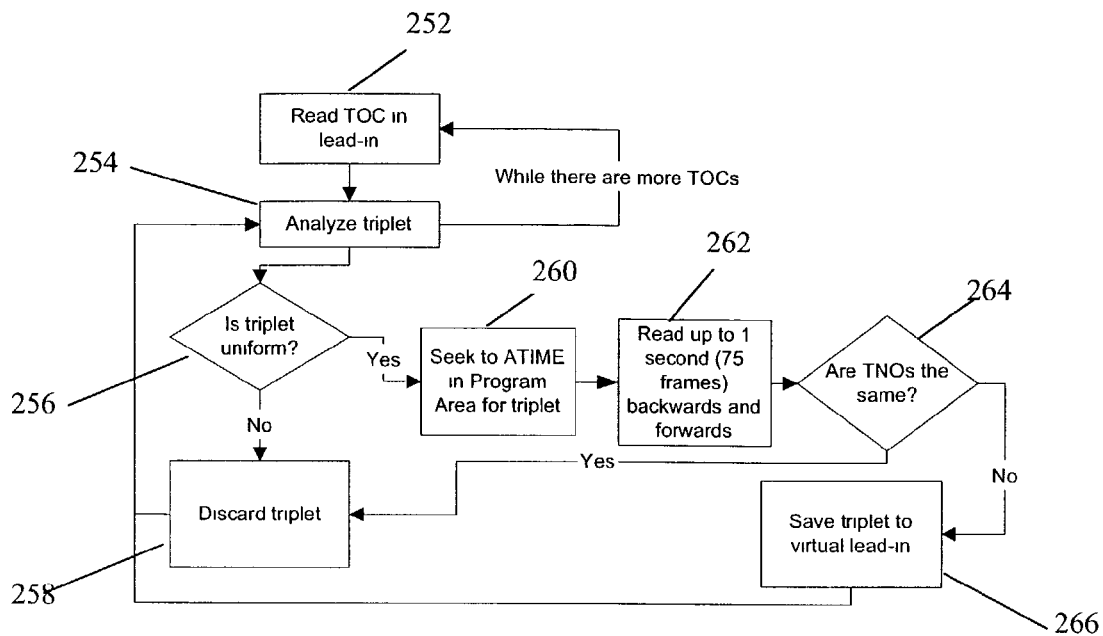
FIG. 22 is a flow-chart illustration of a technique for creating a true lead-in, according to an embodiment of the present invention.

FIG. 22, to which reference is now made, is a flow-chart illustration of a method for creating a true lead-in. The TOC is read (step 252) and for each triplet in the instance of the TOC, the triplet is analyzed (step 254). If the triplet is not uniform (query box 256), it is discarded (step 258).

If the triplet is uniform, the ATime pointed to by the triplet is sought and the Q channel at the Atime in the Program Area is read (step 260). An analysis (step 262) of the frames (both backwards and forwards of the Atime) is then made. For example, since one second of time is equivalent to 75 frames, by analyzing one second either side of the Atime, it should be possible b locate a frame with the same track number as the triplet within one second of the Atime. However, an analysis may be made for a longer period.

Thus, for example if the track number (TNO) (of the next backward frame) is not one less than the track number (TNO) of the following frame (query box 264), the triplet is discarded (step 258). If the ADR/Ctrl field of the triplet has the data bit set but the frame does not have the corresponding data bit set, the bit is reset to audio. If the track number (TNO) is correct, the triplet is saved into a memory reconstruction of the TOC (step 266).

If an instance is incomplete (for example, if the A0–A2 items indicate more tracks or a longer disc than the reconstructed TOC), steps 254–266 are repeated for the next instance of the TOC.

Once a complete and valid TOC has been reconstructed, the disc may be read according to the reconstructed valid TOC.

Figure 23:
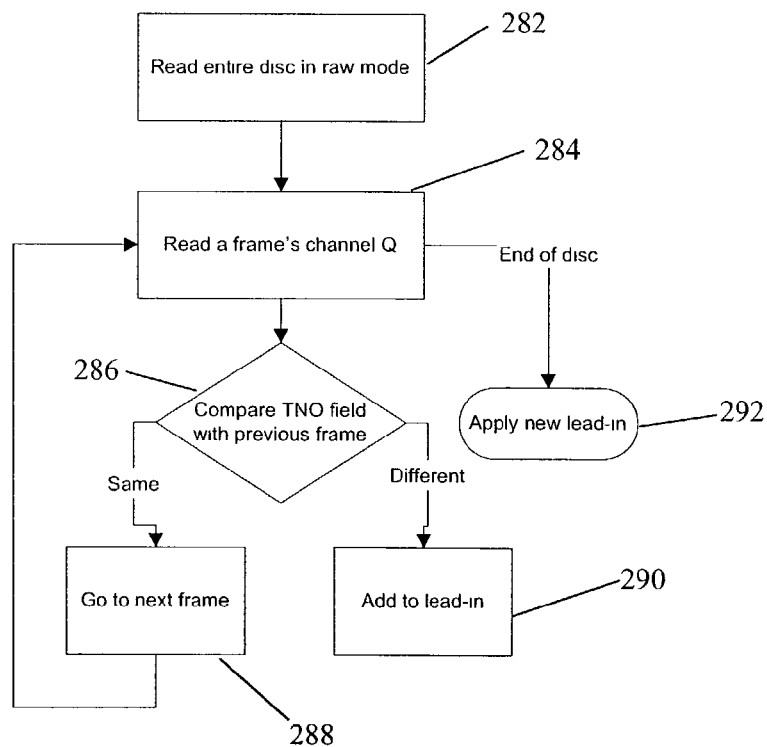
FIG. 23 is a flow-chart illustration of a further technique for creating a true lead-in, according to a further embodiment of the present invention.

In an alternative embodiment, the entire Program Area may be read in 2448-byte raw mode, thereby preserving the main channel and subchannel. Following the entire read, the channel Q may be analyzed using the algorithm illustrated in FIG. 23 to which reference is now made.

The entire disc is read in raw mode (step 282) and the channel Q of the frame is read (step 284). The track number (TNO) of the frame is compared with track number (TNO) of the previous frame (query box 286). If the track number (TNO) is the same as the previous track number (TNO), the next frame is then read (steps 288) and steps 284–286 are repeated. If the track number (TNO) is greater than the previous frame, a TOC entry with the new track number and the ATime of the current frame is created I (step 290).

Steps 284–290 are then repeated until the end of the disc (step 292). Each track may then be interpreted from its image in the correct mode.

This document describes examples applying polymorphic lead-ins to the audio portion of an audio or multi-session audio-data disc; however, all such examples are non-limiting.

While the invention has been described with respect to a limited number of embodiments, it will be appreciated that many variations, modifications and other applications of the invention may be made.

What is claimed is:

1. An optical disc having at least one session, said at least one session comprising a lead-in having a plurality of subcoding blocks, each of said plurality of subcoding blocks comprising an item in channel Q, said item comprising at least a Point (PT), address/control (Adr/Ctrl), absolute-time minutes (Pmin), absolute-time seconds (Psec) and absolute-time frames (Pframe)

wherein the Point of the item in at least one of said plurality of subcoding blocks is identical to the Point of another item in at least one other of said plurality of subcoding blocks;

wherein a value of at least one of a group including Adr/Ctrl, Pmin, Psec and Pframe of the item in said at least one of said plurality of subcoding blocks differs from a corresponding value of at least one of the corresponding group of Adr/Ctrl, Pmin, Psec and Pframe of the other item in said at least one other of said plurality of subcoding blocks;

wherein said plurality of subcoding blocks comprise a continuous repetition of table of contents (TOCs), wherein at least one item in at least one of the group including Adr/Ctrl, Pmin, Psec and Pframe of one of said repetition of table of contents (TOCs) has a different value from the corresponding item in at least one other of said repetition of table of contents (TOCs);

wherein said one of said repetition of table of contents (TOCs) comprises a misleading or invalid triplet; and wherein said misleading or invalid triplet comprises a misleading or invalid point.

2. An optical disc having at least one session, said at least one session comprising a lead-in having a plurality of subcoding blocks, each of said plurality of subcoding blocks comprising an item in channel Q, said item comprising at least a Point (PT), address/control (Adr/Ctrl), absolute-time minutes (Pmin), absolute-time seconds (Psec) and absolute-time frames (Pframe);

wherein the Point of at least one of said plurality of subcoding blocks is identical to the Point in at least one other of said plurality of subcoding blocks;

wherein the value of at least one of a group including Adr/Ctrl, Pmin, Psec and Pframe in said at least one of said plurality of subcoding blocks differs from the value of at least one of the corresponding group of Adr/Ctrl, Pmin, Psec and Pframe in said at least one other of said plurality of subcoding blocks;

wherein said plurality of subcoding blocks comprise a continuous repetition of table of contents (TOCs), wherein at least one item in at least one of the group including Adr/Ctrl, Pmin, Psec and Pframe of one of said repetition of table of contents (TOCs) has a different value from the corresponding item in at least one other of said repetition of table of contents (TOCs); and wherein said one of said repetition of table of contents (TOCs) comprises an interleaved pattern of alternating valid and invalid triplets.

3. The optical disc according to claim 2, wherein said alternating valid and invalid triplets are represented by audio and data item respectively, or vice versa.

4. The optical disc according to claim 2, wherein said pattern is randomized.

5. The optical disc according to claim 4, wherein each track is represented by at least one audio and one data item.

6. The optical disc according to claim 4, wherein one of the points of said one of said repetition of table of contents (TOCs) remain uniform.

7. An optical disc having at least one session, said at least one session comprising a lead-in having a plurality of subcoding blocks, each of said plurality of subcoding blocks comprising an item in channel Q, said item comprising at least a Point (PT), address/control (Adr/Ctrl), absolute-time minutes (Pmin), absolute-time seconds (Psec) and absolute-time frames (Pframe)

wherein the Point of the item in at least one of said plurality of subcoding blocks is identical to the Point of another item in at least one other of said plurality of subcoding blocks;

wherein a value of at least one of a group including Adr/Ctrl, Pmin, Psec and Pframe of the item in said at least one of said plurality of subcoding blocks differs from a corresponding value of at least one of the corresponding group of Adr/Ctrl, Pmin, Psec and Pframe of the other item in said at least one other of said plurality of subcoding blocks; and wherein said plurality of subcoding blocks comprise a plurality of zones, wherein an alteration algorithm is applied to each of said plurality of zones.

8. The optical disc according to claim 7, further comprising a multi-session disc having a plurality of multi-session pointers, wherein at least one of said plurality of multi-session pointers is invalid or misleading.

9. An optical disc having at least one session, said at least one session comprising a lead-in having a plurality of subcoding blocks, each of said plurality of subcoding blocks comprising an item in channel Q, said item comprising at least a Point (PT), address/control (Adr/Ctrl), absolute-time minutes (Pmin), absolute-time seconds (Psec) and absolute-time frames (Pframe);

wherein the Point of at least one of said plurality of subcoding blocks is identical to the Point in at least one other of said plurality of subcoding blocks;

wherein the value of at least one of a group including Adr/Ctrl, Pmin, Psec and Pframe in said at least one of said plurality of subcoding blocks differs from the value of at least one of the corresponding group of Adr/Ctrl, Pmin, Psec and Pframe in said at least one other of said plurality of subcoding blocks;

wherein said plurality of subcoding blocks comprise a plurality of zones, wherein an alteration algorithm is applied to each of said plurality of zones; and wherein said plurality of zones comprise any combination of a group including a valid table of contents (TOCs), an invalid table of contents (TOCs), an interleaved pattern of alternating valid and invalid entries and one of a group including at least one data track or at least one invalid triplet, wherein said invalid table of contents (TOCs) comprises one repetition of the table of contents (TOCs), which is different from at least one other of repetition of the table of contents (TOCs).

10. An optical disc having at least one session, said at least one session comprising a lead-in having a plurality of subcoding blocks, each of said plurality of subcoding blocks comprising an item in channel Q, said item comprising at least a Point (PT), address/control (Adr/Ctrl), absolute-time minutes (Pmin), absolute-time seconds (Psec) and absolute-time frames (Pframe)

wherein the Point of the item in at least one of said plurality of subcoding blocks is identical to the Point of another item in at least one other of said plurality of subcoding blocks;

wherein a value of at least one of a group including Adr/Ctrl, Pmin, Psec and Pframe of the item in said at least one of said plurality of subcoding blocks differs from a corresponding value of at least one of the corresponding group of Adr/Ctrl, Pmin, Psec and Pframe of the other item in said at least one other of said plurality of subcoding blocks; and a multi-session disc having a plurality of multi-session pointers, wherein at least one of said plurality of multi-session pointers is invalid or misleading.

11. A method for generating a valid lead-in containing continuous repetition of table of contents (TOCs), said method comprising the steps of: a. reading the entire Program Area; b. reading the channel Q of a frame being analyzed; c. comparing the track number (TNO) of the analyzed frame with the track number (TNO) of the previous frame; d. if the track number (TNO) of the analyzed frame is greater than the track number (TNO) of the previous frame, creating a TOC entry with the new track number and the absolute-time (ATime) of the analyzed frame.

\* \* \* \* \*